United States Patent
Kang et al.

(10) Patent No.: US 10,374,686 B2
(45) Date of Patent: Aug. 6, 2019

(54) METHOD OF DETERMINING DOPPLER FREQUENCY TRANSMISSION BEAM IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Kitae Kim, Seoul (KR); Kilbom Lee, Seoul (KR); Kyungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 15/521,150

(22) PCT Filed: Dec. 16, 2015

(86) PCT No.: PCT/KR2015/013804
§ 371 (c)(1),
(2) Date: Apr. 21, 2017

(87) PCT Pub. No.: WO2016/153152
PCT Pub. Date: Sep. 29, 2016

(65) Prior Publication Data
US 2018/0102825 A1    Apr. 12, 2018

Related U.S. Application Data

(60) Provisional application No. 62/137,788, filed on Mar. 24, 2015.

(51) Int. Cl.
*H04B 7/04*    (2017.01)
*H04B 7/08*    (2006.01)
*H04B 7/0408*    (2017.01)

(52) U.S. Cl.
CPC .......... *H04B 7/088* (2013.01); *H04B 7/0408* (2013.01)

(58) Field of Classification Search
CPC ........ G01S 11/10; G01S 15/58; G01S 3/8022; G01S 7/288; G01S 13/524; G01S 19/29;
(Continued)

(56) References Cited

U.S. PATENT DOCUMENTS 3,153,233 A * 10/1964 Goldmuntz ............. G01S 13/60
342/113
2006/0264184 A1* 11/2006 Li ........................... H01Q 3/24
455/101

FOREIGN PATENT DOCUMENTS

KR    10-2008-0040388 A    5/2008
KR    10-2012-0128884 A    10/2012
(Continued)

*Primary Examiner* — Rahel Guarino
(74) *Attorney, Agent, or Firm* — Birch, Stewart, Kolasch & Birch, LLP (57) ABSTRACT

A method of receiving a signal, which is received by a receiving end in a wireless communication system, is disclosed in the present specification. The method includes the steps of calculating effective Doppler spread values of reception beam combinations, wherein each reception beam combination consists of two or more reception beams among a plurality of reception beams; selecting a first reception beam combination from the reception beam combinations using the effective Doppler spread values; and receiving the signal from a transmitting end using at least one reception beam included in the selected first reception beam combination.

11 Claims, 9 Drawing Sheets

(58) Field of Classification Search
CPC .... H04B 7/0617; H04B 7/088; H04B 7/0413; H04B 7/0695; H04B 7/0897; H04B 7/04; H04B 7/1855; H04B 7/0408; H04L 27/2647
See application file for complete search history.

(56) References Cited

FOREIGN PATENT DOCUMENTS

| | | |
|---|---|---|
| WO | WO 2014/084694 A1 | 6/2014 |
| WO | WO 2014/088185 A1 | 6/2014 |

* cited by examiner

METHOD OF DETERMINING DOPPLER FREQUENCY TRANSMISSION BEAM IN WIRELESS COMMUNICATION SYSTEM AND APPARATUS THEREFOR

CROSS REFERENCE TO RELATED APPLICATIONS

This application is the National Phase of PCT International Application No. PCT/KR2015/013804, filed on Dec. 16, 2015, which claims priority under 35 U.S.C. 119(e) to U.S. Provisional Application No. 62/137,788, filed on Mar. 25, 2015, all of which are hereby expressly incorporated by reference into the present application.

TECHNICAL FIELD

The present invention relates to a wireless communication system, and more particularly, to a system making use of beamforming with multiple beams between two ends of a communication.

BACKGROUND ART

Beamforming techniques are used in wireless communication systems increase throughput and/or density of cells.

Beamforming may be divided into transmission beamforming which is performed by the transmitting side and reception beamforming which is performed by the receiving side. Transmission beamforming generally uses a plurality of antennas and concentrates signals transmitted from respective antennas in a particular direction (that is, space), so as to increase directivity. A set of a plurality of antennas is referred to as an array antenna, and an antenna included in the array antenna is referred to as an antenna element or an array element. The antenna array may be configured in various types such as a linear array and a planar array. When the transmission beamforming is used, the distance of arrival can be increased through a signal directivity increase, and the signal is not transmitted in any direction other than the corresponding direction. As a result, interference influencing another user can be significantly reduced.

The receiving side may perform the reception beamforming by using a reception array antenna. The reception beamforming concentrates received radio waves to be directed in a particular direction, increases sensitivity of signals received from the particular direction, and excludes signals received from another direction, so as to block interference signals.

For future standards, it is expected that Multiple-Input Multiple-Output (MIMO) precoding will be a typical way of implementing beamforming.

MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 1:
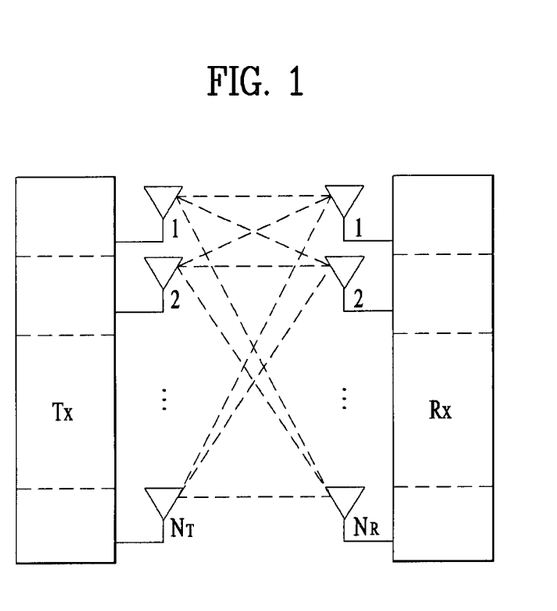
FIG. 1 is a diagram illustrating a configuration of a general MIMO communication system.

FIG. 1 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 1. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R)$$

[Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$

[Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Another aspect of future wireless communication standards is that users will expect to enjoy the services in vehicles, i.e. with significant relative speeds between the transmitter and the receiver. The relative speed gives rise to distortions of the radiofrequency spectrum due to the Doppler effect.

In conventional systems, the Doppler effect is considered detrimental and it is compensated by an adjustment of the frequency of local oscillators. Doppler shifts become larger as the carrier frequencies used by wireless systems are higher and higher.

DISCLOSURE

Technical Problem

A new method is proposed to manage wireless communications making use of beamforming when the radio channels undergo Doppler shift.

Technical Solution

In accordance with the purpose of the present invention, as embodied and broadly described, according to one embodiment, a method of receiving a signal at a receiving end in a wireless communication system, includes the steps of calculating effective Doppler spread values of reception beam combinations, wherein each reception beam combination consists of two or more reception beams among a plurality of reception beams, selecting a first reception beam combination from the reception beam combinations using the effective Doppler spread value and receiving the signal from a transmitting end using at least one reception beam included in the selected first reception beam combination. In particular, the effective Doppler spread value of a reception beam combination may correspond to a difference between a maximum Doppler frequency and a minimum Doppler frequency of reception beams included in said the reception beam combinations.

Preferably, the step of selecting the first reception beam combination can include the step of selecting a reception beam combination of which the effective Doppler spread value is highest among the reception beam combinations or the step of selecting a reception beam combination of which the effective Doppler spread value is lowest among the reception beam combinations.

More preferably, the method can further include the step of selecting a second reception beam combination from the reception beam combinations as a transmission beam combination using the effective Doppler spread values.

To further achieve these and other advantages and in accordance with the purpose of the present invention, as embodied and broadly described, according to a different embodiment, a receiver in a wireless communication system can include a wireless communication module (1130) configured to receive a signal from a transmitter and a processor (1110) configured to process the signal, the processor being configured to calculate effective Doppler spread values of reception beam combinations, wherein each reception beam combination consists of two or more reception beams among a plurality of reception beams, the processor being further configured to select a reception beam combination from the reception beam combinations using the effective Doppler spread values, the processor being further configured to control the wireless communication module to receive the signal from a transmitting end using at least one reception beam included in the selected reception beam combination.

Preferably, the processor can select a reception beam combination of which the effective Doppler spread value is highest among the reception beam combinations or a reception beam combination of which the effective Doppler spread value is lowest among the reception beam combinations. More preferably, the processor can select a second reception beam combination from the reception beam combinations as a transmission beam combination using the effective Doppler spread values.

In the embodiments, the receiving end has plural reception antenna arrays, and each reception beam combination has a respective reception beam for each reception antenna array. And, the selected first reception beam combination can include a main reception beam and an alternative reception beam with which the main reception beam is to be replaced.

Advantageous Effects

According to embodiments of the present invention, it is possible to perform signal transmission and reception optimized for a radio channel status in a manner of more efficiently determining a reception beam combination through Doppler frequency analysis.

Effects obtainable from the present invention may be non-limited by the above mentioned effect. And, other unmentioned effects can be clearly understood from the following description by those having ordinary skill in the technical field to which the present invention pertains.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Reference will now be made in detail to the preferred embodiments of the present invention, examples of which are illustrated in the accompanying drawings.

Unlike a legacy wireless communication system, a center frequency of an ultrahigh frequency wireless communication system is configured to operate on several GHz to scores of GHz. An ultrahigh frequency characteristic of the center frequency makes worse a Doppler effect appearing according to movement of a user equipment and a carrier frequency offset (hereinafter, CFO) impact occurred due to an oscillator error between a user equipment and a base station. In particular, the Doppler effect has a characteristic of linearly increasing in response to the center frequency. The CFO, which occurs due to the oscillator error between a user equipment and a base station, shows a ppm ($=10^{-6}$) and also has a characteristic of linearly increasing in response to the center frequency.

In a legacy cellular network, in order to solve a problem of the CFO, a base station transmits a synchronization channel and a pilot signal/reference symbol to a user equipment and the user equipment estimates/compensates the CFO using the same. Hence, in the ultrahigh frequency wireless communication, in order to estimate/compensate the CFO of which an offset value is greater than an offset value of the legacy cellular network, it is necessary to transmit a synchronization channel in a different way. For example, as shown in the following, a legacy LTE/LTE-A system regulates an error value of an oscillator between a user equipment and a base station as follows.

A carrier frequency modulated by a UE is compared with a carrier frequency received from an eNB. The carrier frequency modulated by the UE should exist within a range of ±0.1 PPM over a slot, i.e., 0.5 ms.

In the aspect of a base station, a difference between a frequency actually transmitted by the base station and an allocated frequency is defined as a frequency error, i.e., error value. As shown in the following Table 1, accuracy of an oscillator is individually defined according to a type of a base station.

TABLE 1

| BS class | Accuracy |
| --- | --- |
| Wide Area BS | ±0.05 ppm |
| Local Area BS | ±0.1 ppm |
| Home BS | ±0.25 ppm |

Hence, a maximum difference of an oscillator between a base station and a UE corresponds to ±0.1 ppm. If an error occurs in one direction, it may have a maximum offset value of 0.2 ppm. A formula for converting a ppm value into a Hz unit in accordance with each center frequency is to multiply a center frequency by a frequency offset. In this case, a unit corresponds to ppm.

Meanwhile, an impact of a CFO value varies according to subcarrier spacing in an OFDM system. In general, although a CFO value is big, the CFO value has less impact on the OFDM system, which has wide subcarrier spacing. Hence, since it is necessary to represent an actual CFO value (absolute value) by a relative value making an impact on the OFDM system, it, is possible to represent a CFO value by a normalized CFO of which the CFO value is divided by subcarrier spacing. Table 2 in the following shows each center frequency, a CFO value for an error value of an oscillator and a normalized CFO.

TABLE 2

| Center frequency (subcarrier spacing) | Oscillator Offset | | | |
|---|---|---|---|---|
| | ±0.05 ppm | ±0.1 ppm | ±10 ppm | ±20 ppm |
| 2 GHz(15 kHz) | ±100 Hz(±0.0067) | ±200 Hz(±0.0133) | ±20 kHz(±1.3) | ±40 kHz(±2.7) |
| 30 GHz(104.25 kHz) | ±1.5 kHz(±0.014) | ±3 kHz(±0.029) | ±300 kHz(±2.9) | ±600 kHz(±5.8) |
| 60 GHz(104.25 kHz) | ±3 kHz(±0.029) | ±6 kHz(±0.058) | ±600 kHz(±5.8) | ±1.2 MHz(±11.5) |

Referring to Table 2, in case of 2 GHz, subcarrier spacing (15 kHz) used in LTE Rel-8/9/10 is assumed. In case of 30 GHz and 60 GHz, subframe spacing (104.25 kHz) is assumed to avoid performance degradation in consideration of Doppler effect for each center frequency. Yet, this is just an example. It is apparent that a different subcarrier spacing is applicable on each center frequency.

Meanwhile, a Doppler spread phenomenon plays a big part in a situation that a user equipment moves fast or a situation that the user equipment slowly moves on a high frequency band. Doppler spread causes spread in frequency domain and generates distortion of a signal as a result. The Doppler spread can be represented as Equation 8 in the following.

$$f_{doppler} = (v/\lambda)\cos\theta \quad \text{[Equation 8]}$$

In Equation 8, v corresponds to a moving speed of a user equipment and λ corresponds to a wavelength of a center frequency of a radio wave transmitted by a base station or a user equipment. And, θ corresponds to an angle between a received radio wave and moving direction of a user equipment. For clarity of explanation, assume that θ corresponds to 0.

In this case, coherence time $T_c$ has such a relation as $$T_c \approx \frac{1}{f_{doppler}}.$$

If time interval of which a correlation value of a channel response is equal to or greater than 50% is defined as the coherence time in time domain, it is possible to represent the coherence time as $$T_c \approx \frac{9}{16\pi f_{doppler}}.$$

In a wireless communication system, coherence time shown in the following Equation 9 and a Doppler spread relation are mainly used using a geometric mean of the aforementioned two formulas.

$$T_c = \sqrt{\frac{9}{16\pi f_{doppler}}} = \frac{0.423}{f_{doppler}} \quad \text{[Equation 9]}$$

Doppler power spectrum density (hereinafter, Doppler spectrum) may have various shapes. In general, if a signal received in such environment of rich scattering as a downtown area is received by same power in all directions, the Doppler spectrum has a U-shape.

Figure 2:
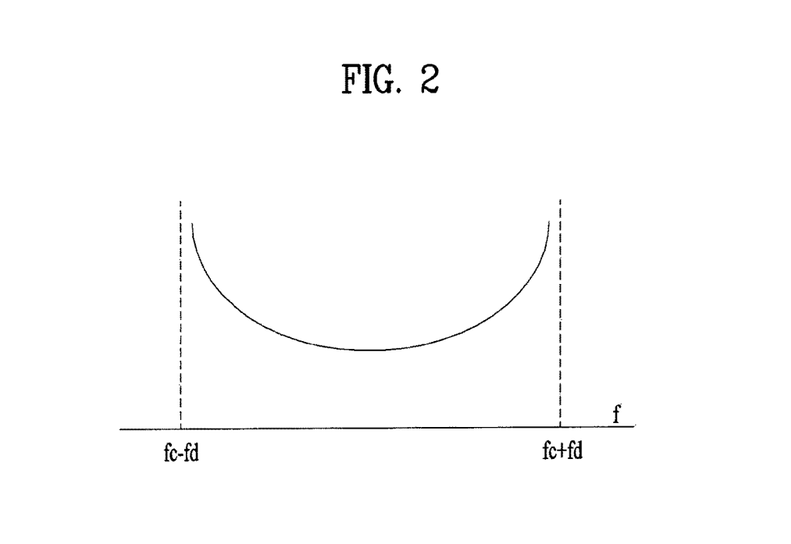
FIG. 2 is a diagram for an example of a Doppler spectrum.

FIG. 2 is a diagram for an example of a Doppler spectrum. In particular, FIG. 2 shows an example of Doppler spectrum having a U-shape when a center frequency corresponds to $f_c$ and a maximum Doppler spread value corresponds to $f_d$.

Since an ultrahigh wireless communication system is positioned at a band of which a center frequency is very high, the system has a merit in that a size of an antenna is small and a plurality of antennas can be installed in a small space. The merit enables pin-point beamforming (pencil beamforming, delicate beamforming or the like) to be performed using dozens or hundreds of antennas. The pin-point beamforming indicates that a signal is not received in a same direction but received in a prescribed angle only.

Figure 3:
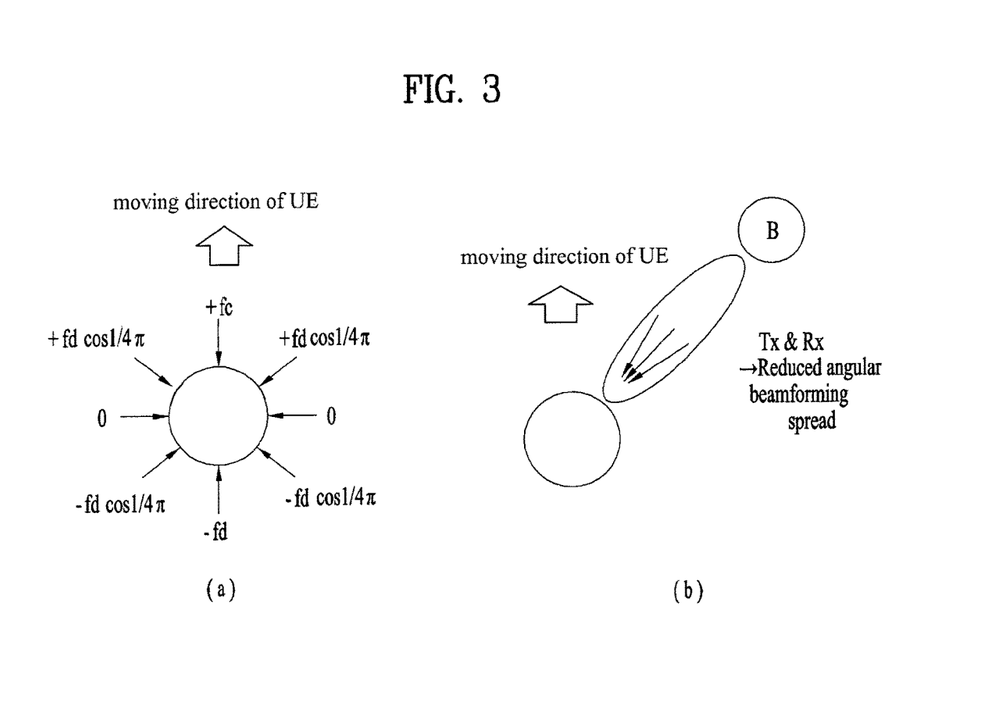
FIG. 3 is a diagram for explaining a concept of pin-point beamforming.

FIG. 3 is a diagram for explaining a concept of pin-point beamforming. In particular, FIG. 3(*a*) shows a Doppler spread value according to movement of a user equipment and FIG. 3(*b*) shows a case of performing pin-point beamforming using a plurality of antennas of signals received in a same direction of which a legacy Doppler spectrum has a U-shape. If the pin-point beamforming is performed according to what is mentioned above, the Doppler spectrum does not have the U-shape due to a reduced angular spread and it may have Doppler spread on a prescribed band only.

Figure 4:
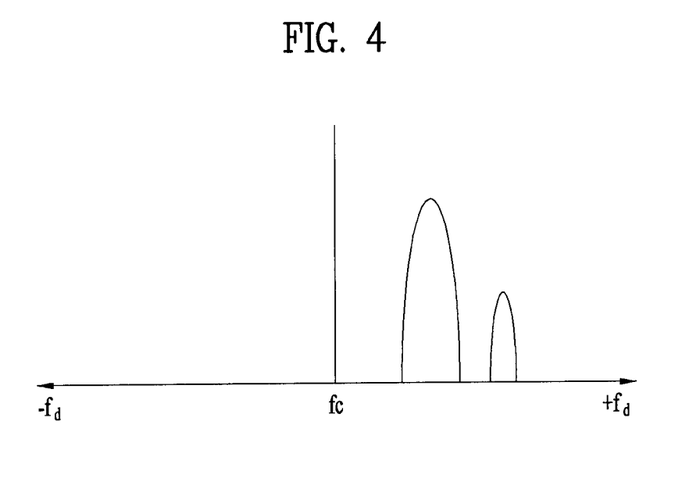
FIG. 4 is a diagram for an example of a Doppler spectrum when pin-point beamforming is performed.

FIG. 4 is a diagram for an example of a Doppler spectrum when pin-point beamforming is performed. In particular, FIG. 4 shows Doppler spectrum when pin-point beamforming is performed or when a signal received by a receiver is not received in a same direction but is received in a narrow angle only.

Meanwhile, a future wireless communication system has a task for providing various services including a heterogeneous communication requirement. For example, there exists a first type of service to be transmitted with very low delay without an error as a remote medical service, whereas there may exist a second type of service of which a requirement for delay or reliability is relatively low and the service requiring a high data rate as a hologram image transmission service.

Moreover, it is expected that a type of a terminal is to be diversified from a current smartphone focus. For example, it is anticipated that an industrial robot, a drone, a vehicle and the like are going to perform communication via a mobile communication network. In particular, after a concept of a network-connected car (connected car) is introduced, a car is rising up as a mobile communication terminal of a new type together with advancement of a recent autonomous driving technology.

In case of a vehicle communication service, a high data rate of a communication link is important for a vehicle information service, whereas low latency, high reliability, security and the like of a communication link are more important for a vehicle safety service.

The present invention proposes a method of determining a reception beam for performing reception beamforming suitable for a service/technical requirement required by a moving terminal or a method of determining a MIMO detector.

Figure 5:
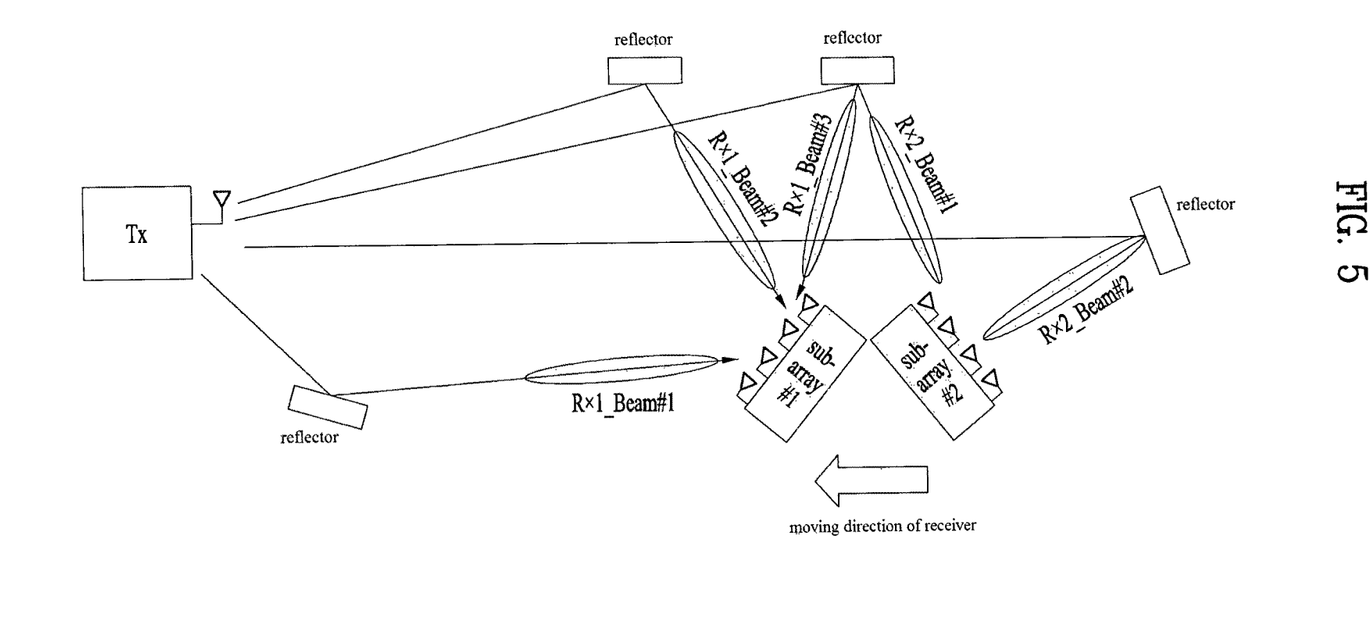
FIG. 5 is a diagram for an example of a signal transmission status to which the present invention is applied and a transmitter structure.

FIG. 5 is a diagram for an example of a signal reception status to which the present invention is applied and a receiver structure.

FIG. 5 shows that an antenna of a receiver consists of two sub-arrays and each sub-array independently forms a single reception beam. In this environment, the receiver can select one from 6 methods in selecting a beam of each sub-array.

{Rx1_B1, Rx2_B1},
{Rx1_B2, Rx2_B1}
{Rx1_B3, Rx2_B1}
{Rx1_B1, Rx2_B2}
{Rx1_B2, Rx2_B2}
{Rx1_B3, Rx2_B2},

In the past, when a reception beam is selected and a related signal is processed, utilizing a difference of Doppler spectrum of each ray (cluster) is not considered. This is because the Doppler spectrum isolation phenomenon shown in FIG. 4 does not appear on a low frequency band. Although the phenomenon appears, the extent of the phenomenon is weak.

Yet, as wireless communication technologies utilizing a band equal to or greater than 10 GHz are recently considered, it is expected that a difference of Doppler spectrum is to be remarkable according to each ray (cluster) on the channel. For example, Doppler spectrum for each ray in FIG. 5 is highly probable to be clearly distinguished from each other as shown in FIG. 6.

Figure 6:
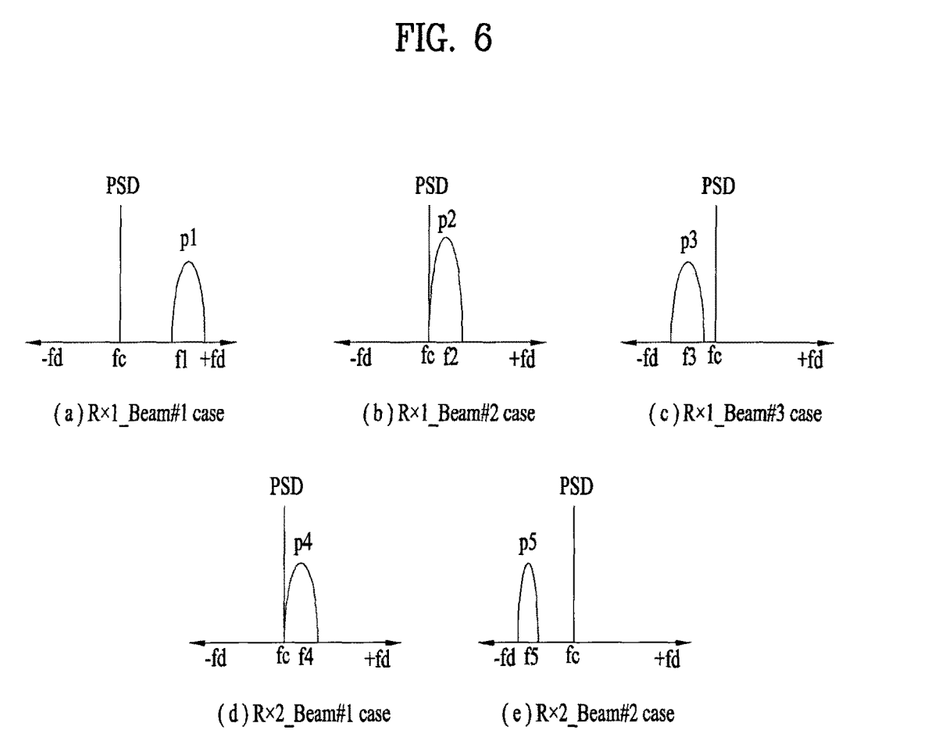
FIG. 6 is a diagram for a Doppler spectrum of a reception beam according to movement of a user equipment on a high frequency band.

FIG. 6 is a diagram for a Doppler spectrum of a reception beam according to movement of a user equipment on a high frequency band.

If a channel characteristic is shown as FIG. 6, unlike a legacy system, an effective Doppler spread characteristic may change by the selection of a reception beam combination in terms of wireless transmission. Regarding this, it shall be described with reference to drawing in the following.

Figure 7:
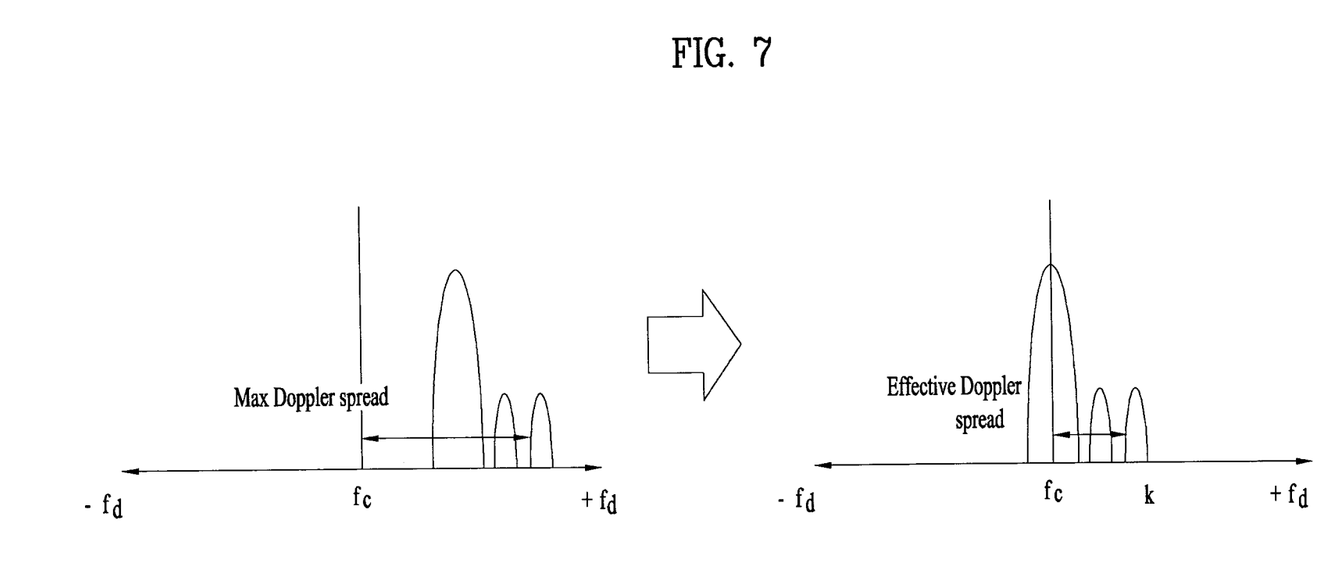
FIG. 7 is a diagram for an example of a concept for compensation and effect when Doppler isolation occurs.

FIG. 7 is a diagram for an example of a concept for compensation and effect when Doppler isolation occurs. Referring to FIG. 7, if Doppler isolation occurs, compensation can be performed in a manner of measuring a Doppler shift value and it is possible to know that effective Doppler spread is reduced.

If the effective Doppler spread is reduced, it may have a merit in that time selectivity becomes relatively smaller and overhead (e.g., pilot density, feedback interval, etc.) for channel estimation is reduced. On the contrary, if the effective Doppler spread is reduced, time diversity effect is reduced and outage performance (or reliability) may be degraded. In particular, a trade-off between a resource efficiency and outage performance may occur by the effective Doppler spread. If it is assumed that it is possible to relatively reduce system overhead by enhancing resource efficiency and improve average system performance, a relation of the aforementioned trade-off can also be interpreted as a relation between average performance and outage performance or a relation between throughput and reliability.

Based on the aforementioned discussion, embodiments of the present invention propose that a receiver utilizes information on the effective Doppler spread or Doppler shift information on each reception beam as follows when the receiver determines a reception beam combination. In this case, the effective Doppler spread indicates (maximum Doppler−minimum Doppler) in a Doppler spectrum consisting of values of which PSD (power spectrum density) is equal to or greater than a specific threshold.

1. High reliability first→High priority is assigned to high effective Doppler spread (first type of service).

2. Low overhead (or high-throughput) first→High priority is assigned to low effective Doppler spread (second type of service).

If high priority is assigned to high effective Doppler spread, it is possible to naturally have an effect of reducing probability of signal outage due to signal block. When an angle between moving direction of a receiver and a ray corresponds to θ, a Doppler value is proportional to cos (θ). Hence, it might be said if the effective Doppler spread is wider, a difference between incidence angles of rays is greater. In this case, although a signal is suddenly blocked in specific direction for a mobile receiver, one may anticipate an effect of enhancing probability of not blocking a different signal.

In other words, the selection scheme used by the receiver will typically lead to selection of a beam combination having a higher effective Doppler spread value for services of the first type (high reliability/overhead) than for services of the second type.

Figure 8:
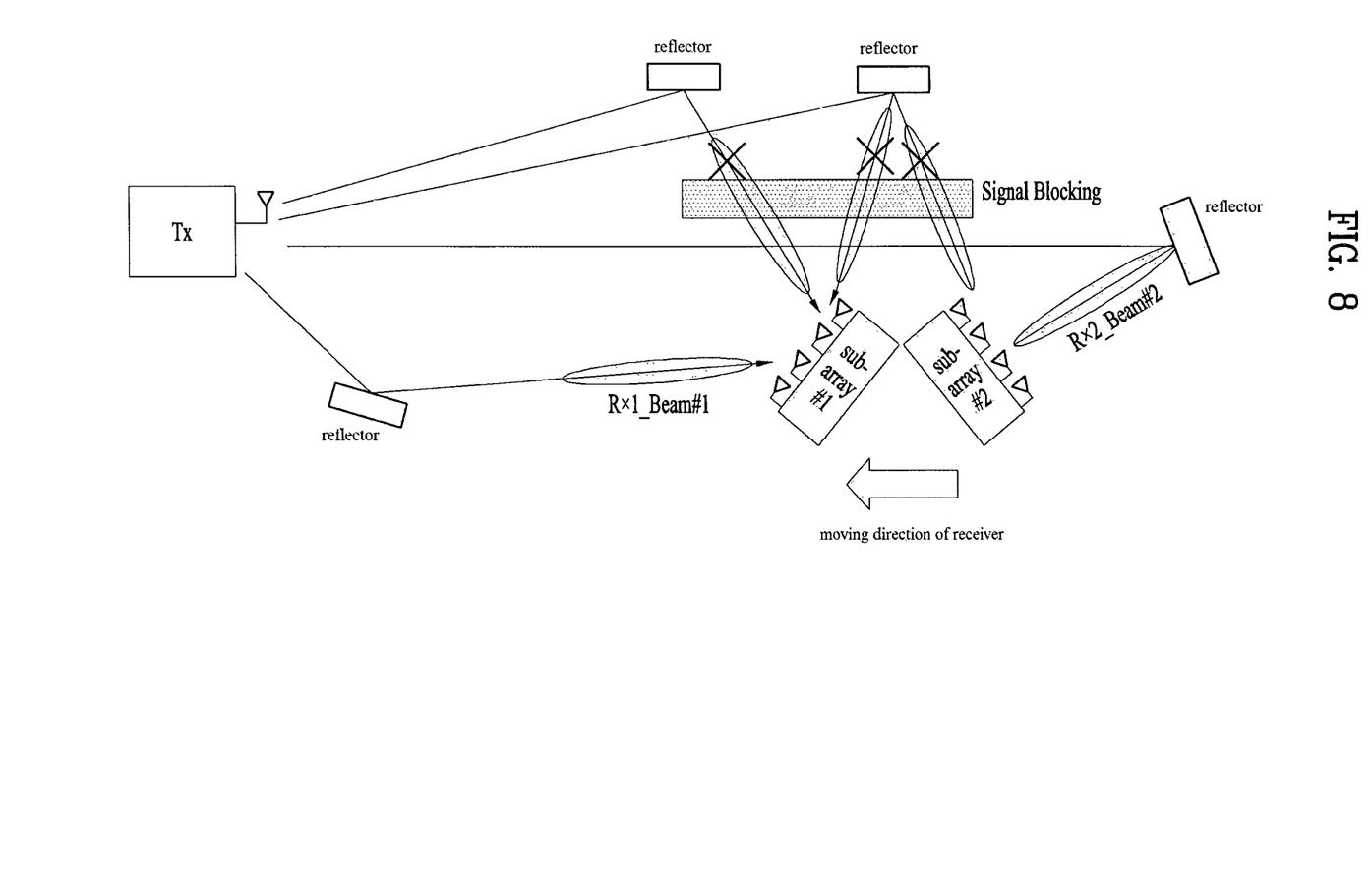
FIG. 8 is a diagram for an example of utilizing effective Doppler spread information when a reception beam combination is determined according to embodiment of the present invention.

FIG. 8 is a diagram for an example of utilizing effective Doppler spread information when a reception beam combination is determined according to a first embodiment of the present invention. In particular, in FIG. 8, assume a case that high priority is assigned to high effective Doppler spread to increase reliability of a reception signal in the example of FIG. 5 and FIG. 6.

In case of assigning high priority to high effective Doppler spread, since effective Doppler spread is going to be greatest in a {Rx1_B1, Rx2_B2} combination, a transmitter will select the beam combination. Since a beam combination selected according to the present invention corresponds to a beam combination of a form that each of rays (clusters) is fully distributed, as shown in FIG. 8, although ray clusters corresponding to reception beams Rx1_B2, Rx1_B3, Rx2_B1 are blocked by a specific object at the same time, it is still possible to select a beam combination capable of maintaining communication.

If a beam combination is selected by a legacy technology of a form that maximizes reception quality in each sub-array, a beam of which a power gain value is high is selected in FIG. 6 and consequently, a {Rx1_B2, Rx2_B1} combination is going to be selected. Although the combination may correspond to an excellent combination in terms of a power gain, the combination may be weak for such a signal blocking situation as FIG. 8. Hence, if the technology proposed by the present invention is applied, link stability can be enhanced.

When a signal is received using two specific beams, if an event for blocking an $i^{th}$ beam corresponds to $B_i$ and an event not blocked corresponds to $B_i^C$, a probability of not transmitting a data packet can be calculated as Equation 10 in the following.

$$P_e = Pr(\text{error}|B_1,B_2)Pr(B_1,B_2) + Pr(\text{error}|B_1,B_2^C)Pr(B_1,B_2^C) + Pr(\text{error}|B_1^C,B_2)Pr(B_1^C,B_2) + Pr(\text{error}|B_1^C,B_2^C)Pr(B_1^C,B_2^C)$$ [Equation 10]

In general, such a relation as Equation 11 in the following can be established.

$$Pr(\text{error}|B_1,B_2) \gg Pr(\text{error}|B_1,B_2^C), Pr(\text{error}|B_1^C,B_2) \gg Pr(\text{error}|B_1^C,B_2^C)$$ [Equation 11]

For a service requiring very high reliability, transmission can be performed to have a value $Pr(\text{error}|B_1^C, B_2^C)$ close to 0 using a modulation scheme and coding schemes. (e.g., $Pr(\text{error}|b_1^C, B_2^C) = 10^{-6}$) Yet, in this environment, as getting close to a high frequency band on which a pathloss difference between LoS and NLoS is severe, a $Pr(error|B_1, B_2)$ value is getting close to 1. Hence, a value for most dominantly influencing on a total error probability may become $Pr(B_1, B_2)$ corresponding to a probability of blocking both beams.

If it is assumed that the probability $Pr(B_1, B_2)$ is identical to $Pr(B_2|B_1)Pr(B_1)$ and a probability of blocking a single beam is identical to each other irrespective of a beam ($Pr(B_1)=Pr(B_2)=$Contant), when a single beam is blocked, it is possible to know that the total error probability is to be determined according to a probability of blocking a different beam at the same time. Consequently, when a single beam is blocked, the present invention may correspond to a method of finding out a beam combination of which a probability of blocking a different beam at the same time is lowest via Doppler spectrum analysis.

On the contrary, in order to reduce channel estimation overhead by reducing effective Doppler spread, it is possible to assign high priority to low effective Doppler spread or low Doppler shift. In FIG. 6, a beam combination can be selected as {Rx1_B2, Rx2_B1}. In this case, channel estimation may be performed with less resource (e.g., a pilot resource, feedback information) using a Doppler compensation scheme.

As a different application example of an embodiment of the present invention, if system corresponds to such a system of which a transmission frequency band and a reception frequency band are identical to each other as a TDD (time division duplex) system, the system can be utilized for selecting a transmission beam by a receiver. Although a system corresponds to a FDD (frequency division duplex) system, if the system corresponds to a system of which a difference between an UL band and a DL band is not significant, the system can also be utilized for selecting a transmission beam by a receiver.

Specifically, in case of a device performing both a transmission function and a reception function, the present invention proposes to utilize a change of effective Doppler spread (or, information on Doppler shift shifted by each reception beamforming) changed by a reception beam combination as follows.

1. High reliability first→High priority is assigned to high effective Doppler spread or high Doppler shift difference 2. Low overhead (or high-throughput) first→High priority is assigned to low effective Doppler spread or low Doppler shift difference The utilizing example A and B are very helpful for a mobile terminal using a TDD system. The aforementioned proposal can also be applied with an identical principle when a transmission beam is utilized instead of a reception beam.

Although an example for a case of forming a single beam according to a sub-array is shown in the aforementioned embodiment, an identical principle and technology can also be applied to a case of configuring a plurality of beams in a single antenna array at the same time.

Figure 9:
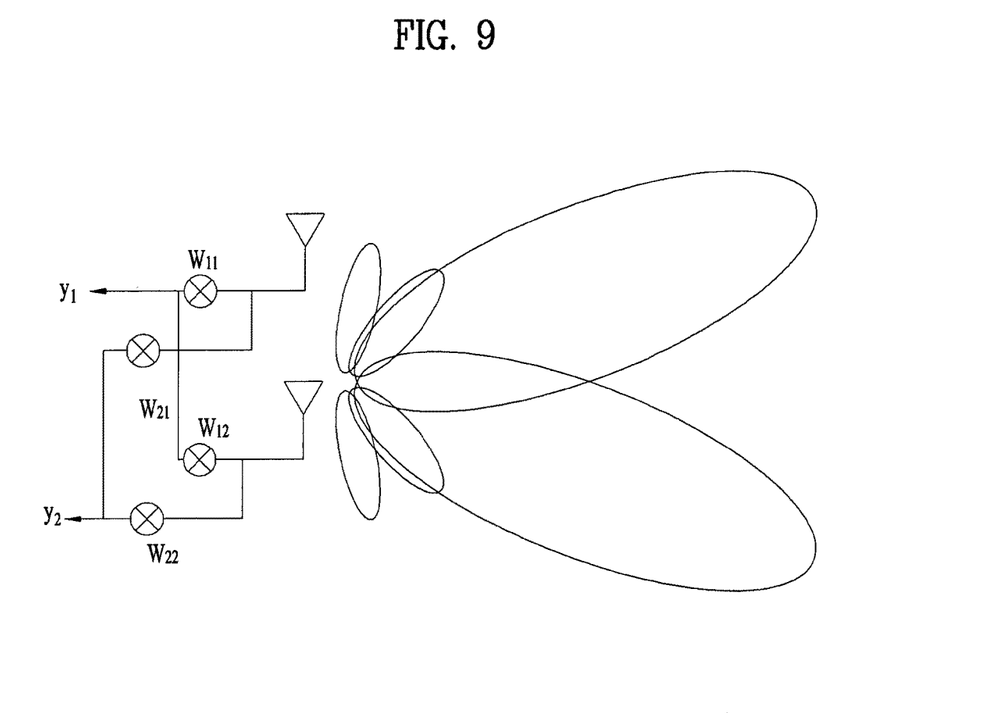
FIG. 9 is a diagram for an example of forming a plurality of reception beams in a single antenna array according to embodiment of the present invention.

FIG. 9 is a diagram for an example of forming a plurality of reception beams in a single antenna array according to embodiment of the present invention. In FIG. 9, w11 and w12 correspond to a beamforming coefficient corresponding to a reception signal y1 and w21 and w22 correspond to a beamforming coefficient corresponding to a reception signal y2.

Figure 10:
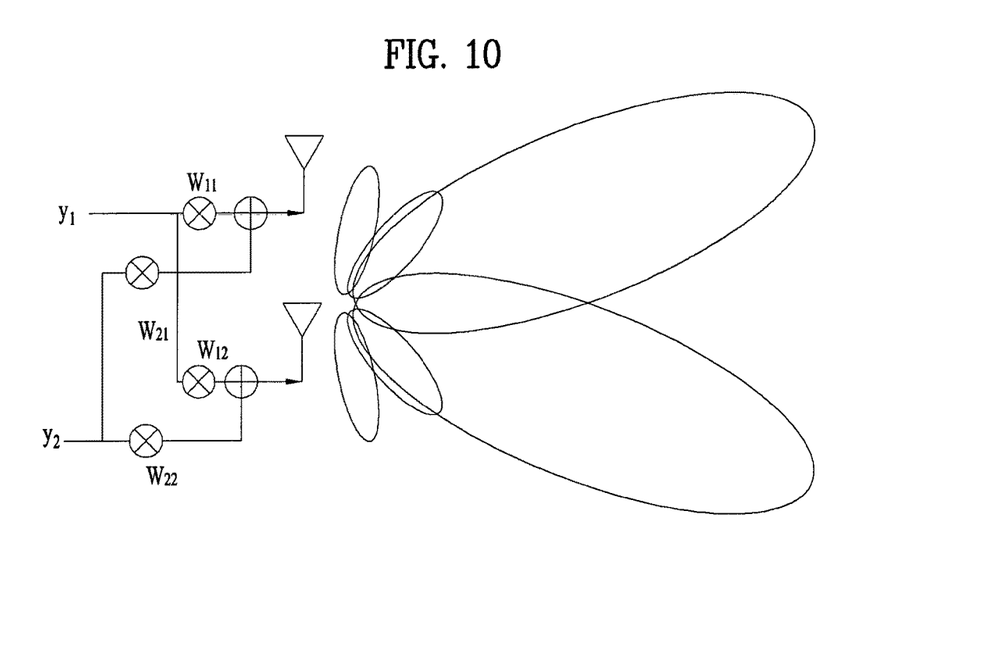
FIG. 10 is a diagram for an example of forming a plurality of transmission beams in a single antenna array according to embodiment of the present invention.

FIG. 10 is a diagram for an example of forming a plurality of transmission beams in a single antenna array according to embodiment of the present invention. Similarly, w11 and w12 correspond to a beamforming coefficient corresponding to a transmission signal x1 and w21 and w22 corresponds to a beamforming coefficient corresponding to a transmission signal x2.

The present invention can be utilized for combining a random transmitter and a receiver with each other. The present invention can be applied to various environments such as downlink when a transmitter corresponds to a base station and a receiver corresponds to a user equipment, uplink when the transmitter corresponds to the user equipment and the receiver corresponds to the base station, and a D2D link when the transmitter corresponds to the user equipment and the receiver corresponds to the user equipment.

The method of selecting a beam combination consisting of a plurality of beams proposed by the present invention can be utilized not only for the purpose of using a plurality of the beams at the same time but also for the purpose of selecting an alternative beam. In this case, the alternative beam can be configured to perform fast beam switching in case of performing retransmission when quality of a main beam used for transmitting a signal is radically degraded by blocking and the like. When the alternative beam is selected, as mentioned earlier in the contents of the present invention, it is possible to select a combination of which a difference between a Doppler shift value of the main beam and a Doppler shift value of the alternative beam is greatest to utilize for improving reliability of a link. By doing so, although a plurality of beams are selected, there may exist a single beam only used for actual transmission on specific time.

The present invention can be applied to both beamforming through analog or digital processing processed on multiple antennas and precoding. If the feedback information is applied to a wideband system, it is possible to feedback a separate feedback information set on each frequency domain in a manner of dividing the wideband system into specific frequency domains (e.g., subband, subcarrier, resource block, etc.). Or, feedback information can be transmitted to a specific frequency domain selected by a user equipment or a specific frequency domain designated by a base station only. The frequency domain can be configured by one or more contiguous frequency domains or non-contiguous frequency domains.

Figure 11:
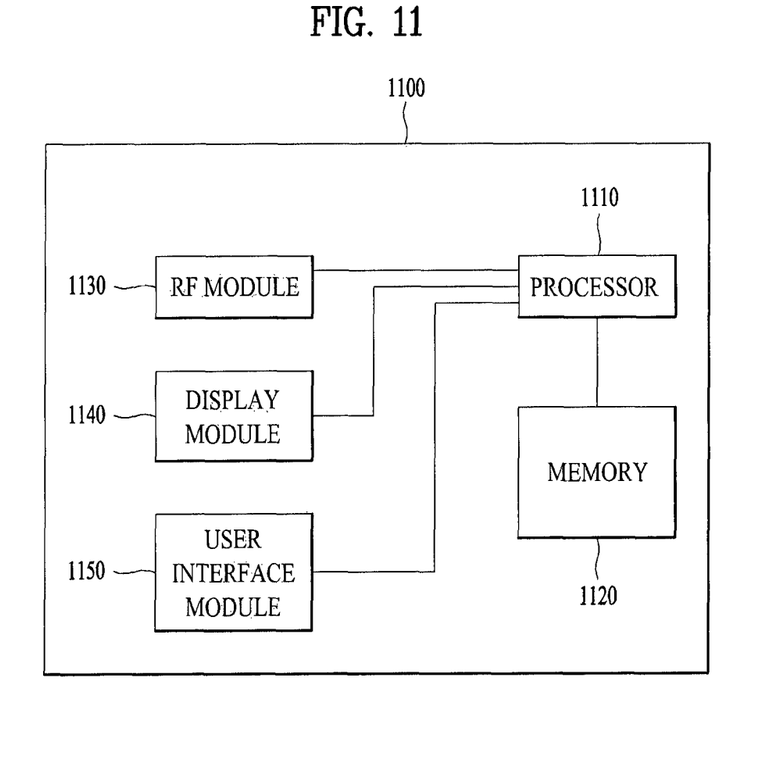
FIG. 11 is a block diagram of a communication apparatus according to an embodiment of the present invention.

FIG. 11 is a block diagram of a communication apparatus according to an embodiment of the present invention. Such apparatus may form part of the transmitting end in the method described above. A similar apparatus may form part of the receiving end.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal.

For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

As mentioned in the foregoing description, embodiments of the present invention are applicable to various kinds of mobile communication systems.

The invention claimed is:

1. A method of receiving a signal at a receiving end in a wireless communication system, the method comprising:
obtaining, by the receiving end, effective Doppler spread values of reception beam combinations,
wherein each reception beam combination includes two or more reception beams among a plurality of reception beams;
determining, by the receiving end, a first reception beam combination having higher effective Doppler spread values for services of a first type than for services of a second type, among the reception beam combinations,
wherein the services of the first type use more overhead than the services of the second type or the services of the second type have a higher throughput than services of the first type; and
receiving, by the receiving end from a transmitting end, the signal based on at least one reception beam included in the first reception beam combination.

2. The method of claim 1, wherein the effective Doppler spread values of a corresponding reception beam combination is a difference between a maximum Doppler frequency and a minimum Doppler frequency of reception beams included in the corresponding reception beam combination.

3. The method of claim 1, wherein the first reception beam combination has a highest effective Doppler spread value among the reception beam combinations.

4. The method of claim 1, wherein second reception beam combination is selected as a transmission beam combination among the reception beam combinations based on the effective Doppler spread values.

5. The method of claim 1, wherein the receiving end has plural reception antenna arrays, and wherein the each reception beam combination has a respective reception beam for each reception antenna array.

6. The method of claim 1, wherein the first reception beam combination includes a main reception beam and an alternative reception beam with which the main reception beam is to be replaced.

7. A receiver in a wireless communication system, the receiver comprising:
a wireless communication module configured to receive a signal from a transmitter; and
a processor configured to process the signal,
wherein the processor is further configured to:
obtain effective Doppler spread values of reception beam combinations,
wherein each reception beam combination includes two or more reception beams among a plurality of reception beams,
determine a reception beam combination having higher effective Doppler spread values for services of a first type than for services of a second type, among the reception beam combinations,
wherein the services of the first type use more overhead than the services of the second type or the services of the second type have a higher throughput than services of the first type, and
control the wireless communication module to receive the signal based on at least one reception beam included in the reception beam combination from the transmitter.

8. The receiver of claim 7, wherein the effective Doppler spread values of a corresponding reception beam combination is a difference between a maximum Doppler frequency and a minimum Doppler frequency of reception beams included in the corresponding reception beam combination.

9. The receiver of claim 7, wherein a second reception beam combination is selected as a transmission beam combination among the reception beam combinations based on the effective Doppler spread values.

10. The receiver of claim 7, wherein the wireless communication module has plural reception antenna arrays, and wherein the each reception beam combination has a respective reception beam for each reception antenna array.

11. The receiver of claim 7, wherein the reception beam combination includes a main reception beam and an alternative reception beam with which the main reception beam is to be replaced.

* * * * *